US005824379A

United States Patent [19]

Riley et al.

[11] Patent Number: 5,824,379

[45] Date of Patent: Oct. 20, 1998

[54] COMPOSITE LABEL WEB

[75] Inventors: Brad S. Riley, Xenia; Frederick M. Pou, Bellbrook, both of Ohio

[73] Assignee: Monarch Marking Systems, Inc., Dayton, Ohio

[21] Appl. No.: 570,038

[22] Filed: Dec. 11, 1995

[51] Int. Cl.[6] ........ B32B 3/02

[52] U.S. Cl. ........ 428/40.1; 283/81; 428/42.2; 428/42.3; 428/43; 428/137; 428/138; 428/192; 428/194; 428/906; 428/914

[58] Field of Search ........ 428/40.1, 42.2, 428/42.3, 43, 906, 914, 137, 138, 192, 194; 283/81; 40/638

[56] References Cited

U.S. PATENT DOCUMENTS

| | | | |
|---|---|---|---|
| 2,636,297 | 4/1953 | Johnson | 40/638 |
| 3,501,365 | 3/1970 | Marshall | 428/42.3 |
| 3,706,626 | 12/1972 | Smith et al. | 428/42.3 |
| 3,783,083 | 1/1974 | Jenkins | 428/42.3 |
| 3,820,261 | 6/1974 | Beall, Jr. | 283/60.1 |
| 3,870,867 | 3/1975 | Hamisch, Sr. | 235/487 |
| 4,335,172 | 6/1982 | Sato | 428/42.3 |
| 5,061,946 | 10/1991 | Helmbold et al. | 347/218 |
| 5,227,209 | 7/1993 | Garland | 428/137 |

*Primary Examiner*—Nasser Ahmad
*Attorney, Agent, or Firm*—Joseph J. Grass

[57] ABSTRACT

There is disclosed a composite label web and methods of making and using same. The composite label web has a carrier web and a label material web releasably adhered thereto by pressure sensitive adhesive. The label material web is butt cut laterally at equally longitudinally spaced intervals. The carrier web is perforation cut laterally at equally longitudinally spaced intervals. The butt cuts and the perforation cuts are longitudinally offset to provide a tab. The invention provides the cost and manufacturing advantages of a butt composite label web plus the feature of ease of separation of the leading label from the carrier web.

6 Claims, 2 Drawing Sheets

COMPOSITE LABEL WEB

BACKGROUND OF THE INVENTION

1. Field of the Invention

This invention relates to the art of composite webs of pressure sensitive labels and to methods of making and to methods of using same.

2. Brief Description of the Prior Art

It is known to have composite webs of pressure sensitive labels as shown in U.S. Pat. No. 3,783,083 to Jenkins. Such labels are formed by completely severing a label web laterally at longitudinally spaced intervals. The complete severing is known as a "butt cut" in that the labels butt up against each other because no label web material is removed. Composite label webs made according to such a process are relatively inexpensive.

It is also known to make composite label webs of butt cut labels with lateral weakening in the carrier web in alignment with the butt cuts so that it is easy to tear the carrier web as disclosed for example in U.S. Pat. No. 3,820,261 to Beall, Jr. There may be some difficulty in manually separating the endmost label from the carrier web because the end of the carrier web and the end of the label are co-terminus.

It is also known to provide for "fully die cut" labels as shown in FIGS. 5 and 7 of U.S. Pat. No. 3,501,365 to Marshall or to provide for "semi die cut" labels as shown in FIGS. 2 and 3 of U.S. Pat. No. 3,501,365. While such fully die cut or semi die cut labels are relatively easy to separate from their carrier webs, they are relatively expensive to manufacture because it is necessary to waste the label material adjacent the labels and because manufacture of such labels requires the press to be operated at a relatively slow speed.

Other composite label webs are disclosed in U.S. Pat. No. 2,636,297 to Johnson and U.S. Pat. No. 3,706,626 to Smith et al.

SUMMARY OF THE INVENTION

This invention pertains to a composite label web which has the simplicity and economy of manufacture of butt cut label webs plus the advantage of ease of label separation from the carrier web.

The invention also pertains to methods of making and to methods of using such labels.

A specific embodiment of the invention includes a carrier web having longitudinally spaced laterally extending lines of weakening, a label web releasably adhered by pressure sensitive adhesive to the carrier web, longitudinally extending lines of severing essentially completely separating the label web into labels without removing material from the label web, and wherein the lines of weakening in the carrier web and the lines of severing in the label web are longitudinally offset. The invention also includes a method of making such a composite label web which involves intentionally spacing the lines of complete severing in the label material web from the lines of weakening in the carrier web. The spacing between each adjacent line of severing and line of weakening is preferably relatively small so as not to interfere with tearing the carrier web along the line of weakening while labels are in place on the carrier web. The invention also includes the method of using such a composite web in a label printer. According to the method of using a composite web with offset lines of severing and lines of weakening, the free and portion of the composite web is threaded between a print head and a platen. The line of partial severing of the leading label is in a leading position relative to the adjacent line of complete severing in the label material. Following printing, the leading label can be removed from the carrier web while the composite web is still in the printer. Because of the relative leading and trailing positions of the line of weakening and the adjacent line of complete severing, removal of the leading label leaves a portion of the carrier web exposed and this provides a tab. The next label is easy to remove because the tab can be manually grasped to assist in peeling that label from the carrier web, and so on for each successive label on the carrier web.

DETAILED DESCRIPTION OF THE PREFERRED EMBODIMENTS

Figure 1:
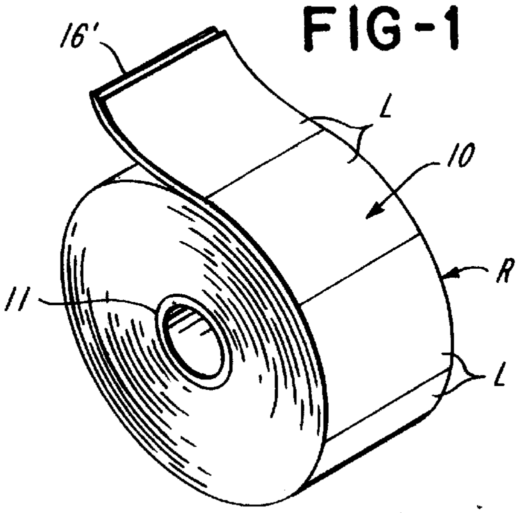
FIG. 1 is a perspective view of a composite label web roll embodying the invention.

With reference to FIG. 1, there is shown a roll R of a composite label web 10. The composite label web is shown to be wound onto a core 11.

Figure 2:
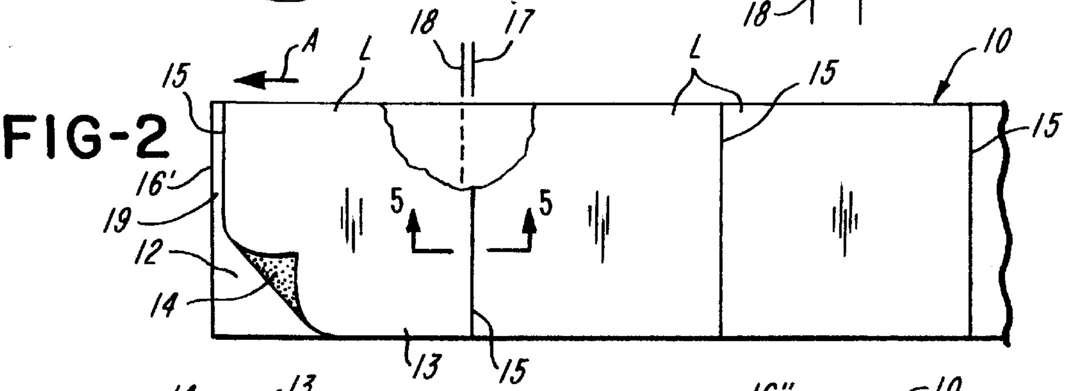
FIG. 2 is a top plan view of a portion of the composite label web shown in roll form in FIG. 1.

FIG. 2 shows the composite label web 10 in a flat plane. The web 10 is comprised of a carrier web 12 which is coated with a release coating. The web 10 is further comprised of a label material web 13 having a coating of pressure sensitive adhesive 14. The coating of adhesive 14 is preferably uniform and as such is known as a "full gum" coating, however, part gum coatings can also be used. The adhesive 14 releasably adheres the label material web 13 to the release coating on the carrier web 12.

The label material web 13 is separated into labels L by longitudinally spaced laterally extending lines of complete severing 15. The longitudinal direction of the composite label web 10 is the lengthwise direction and the lateral direction is the direction across the composite label web 10 and preferably perpendicular to the longitudinal direction. The lines of complete severing 15 are preferably parallel and are preferably equally spaced on the longitudinal direction. The lines of complete severing 15 are made by butt cutting the label web 13 so therefore no label material is removed. The carrier web 12 has longitudinally spaced laterally extending lines of weakening 16 preferably formed by a perforating knife 23'. Such a knife 23' preferably has spaced knife edges disposed in a straight line and thus the resulting line of weakening 16 is preferably straight and is formed of closely spaced knife cuts. It is noted that in making the lines of weakening 16, no carrier web material is removed.

Figure 5:
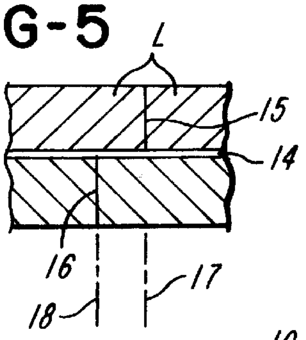
FIG. 5 is an enlarged sectional view taken generally along line 5—5 of FIG. 2.
Figure 8:
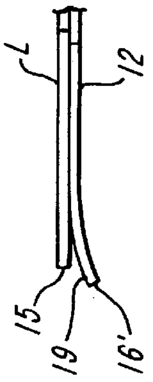
FIG. 8 is a fragmentary elevational view showing how the tab of the carrier can be used to hold separate the leading label from the carrier web.

It can be seen in FIGS. 2 and 5 that the adjacent lines of complete severing 15 and the lines of weakening 16 are longitudinally spaced as shown by spaced respective center lines 17 and 18. The resultant construction preserves the advantage of a butt cut composite label web and makes it easy to peel a label L from the carrier web 12. As shown in FIGS. 1 through 4, the carrier web 12 has been torn along a line of weakening 16 to provide a terminal end 16'. The carrier web 12 projects beyond the leading label L to provide a tab 19. The tab 19 is shown to extend across the entire width of the composite label web 10 so that it can be manually grasped to separate the adjacent leading label L from the carrier web 12 as illustrated in FIG. 8.

Figure 3:
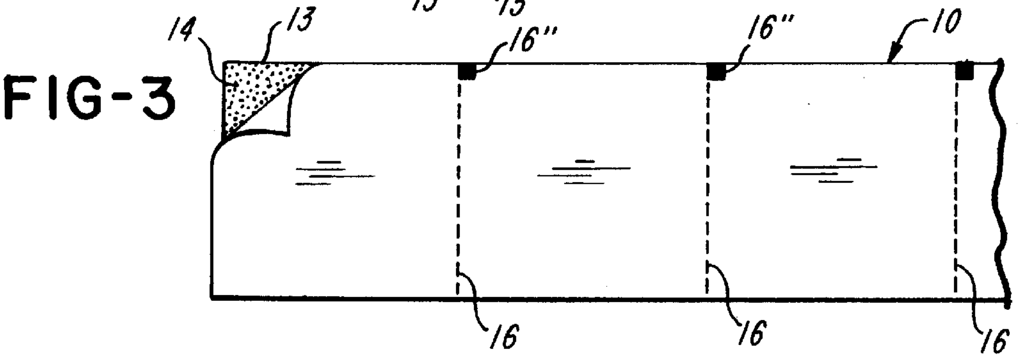
FIG. 3 is a bottom plan view of the composite label web.
Figure 4:
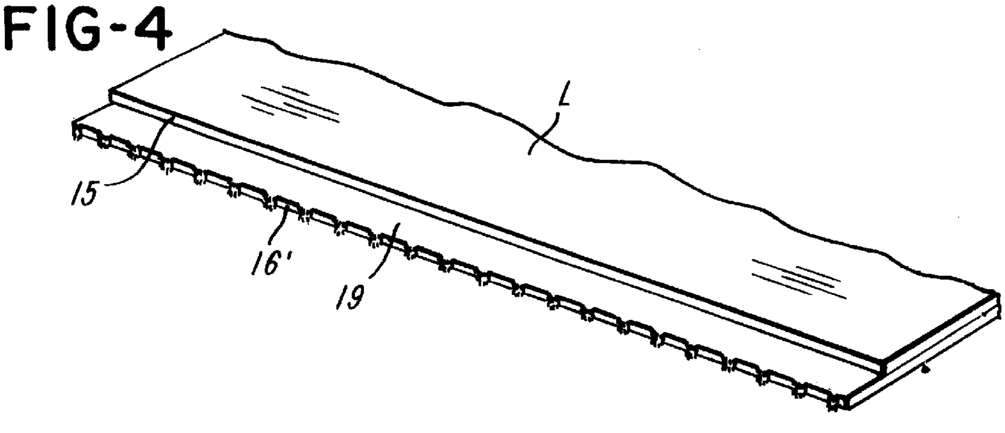
FIG. 4 is an enlarged fragmentary perspective view of the free end portion of the composite label web.

The labels L of the composite label web 10 can be printed with data using a printer generally indicated at 25 having a print head 26 and a platen 27. The composite web 10 would be dispensed from the printer 25 in the direction of arrow A in strip form. It is seen in FIG. 3 that registration marks 16" are provided adjacent each line of weakening 16 to register the labels L with the print head 26. Alternately, detectable holes or notches can be used for registration purposes. It should be noted that because none of the material of the label web 13 has been removed, the labels L can be fully printed is desired. There is no shortening of the labels L as would be the case with a fully die cut label.

It is preferred that the length of the tab 19, that is, the longitudinally distance between the complete severing or butt cut 15 and the adjacent partial severing line or weakening 16 is as small as practical but still enabling easy peeling of the endmost label L. A tab 19 which is relatively short in the longitudinal direction provides minimal resistance to tearing of the composite web 10 along a line of weakening 16. The length of the tab 19 is preferably less than ten percent of the length of a label and preferably less than 0.25 inch. A most preferred length for the tab 19 is about 0.12±0.04 inch.

Figure 6:
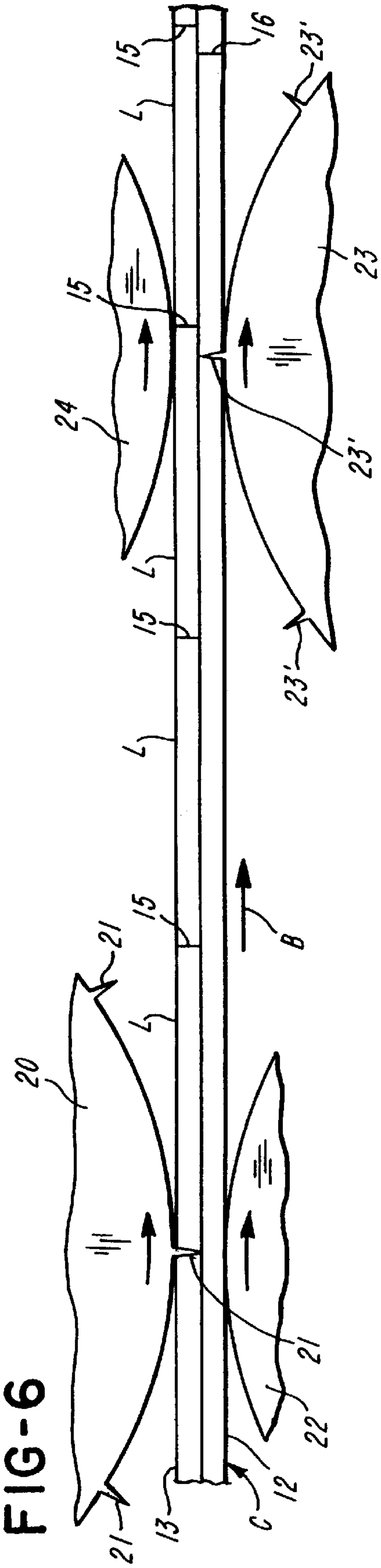
FIG. 6 is a diagrammatic elevational view showing the manner in which the composite label web is manufactured.

With reference to FIG. 6 which depicts the manufacturing process, a composite label web C is shown to pass in the direction of arrow B. A butt cutting roll 20 having elongate cutters 21 one of which is shown to cooperate with a back-up roll 22 to make a complete line of severing, specifically a butt cut extending laterally across the label material 13. From there the composite label web C passes between a perforating roll 23 having perforating knives 23' and a back-up roll 24 to make lines of partial severing 16 in the carrier web 12, and from there the web C is wound into a roll. It is to be understood that, as is conventional, the web C is a wide web which is typically slit into narrower webs which are thereafter wound onto label cores. It should be noted that as the composite label web C is wound into roll form the butt cuts 15 are in the leading position with respect to respective perforation cuts 16. However, as viewed from the free end FE of the composite label web C, the perforation cuts 16 are in the leading position with respect to the butt cuts 15 as shown in FIGS. 2, 3, 4 and 7 in particular.

Figure 7:
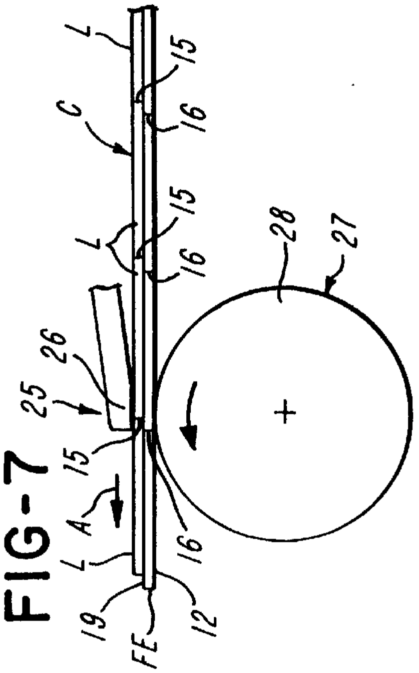
FIG. 7 is a diagrammatic elevational view showing use of the improved composite web in a printer.

With reference to FIG. 7, the free end portion of the composite label web C has been threaded between the print head 26 and the platen 27 in the form of a platen roll 28. The platen roll 28 can be driven to advance the composite label web C. As shown, the leading label L, which is the label L adjacent the free end FE, can be easily stripped or peeled from the carrier web 12 by using the tab 19. Easy stripping of the leading label L is not inhibited even if the print head 26 overlaps the trailing marginal end of the leading label slightly because the leading label is readily pulled off the carrier web 12 from beneath the print head 26 off the carrier web 12. Also, the carrier web 12 can be torn along the adjacent line of partial severing 16 is desired.

FIG. 8 illustrates the ease with which initiation of the removal of the leading label L can be started using tab 19.

Other embodiments and modifications of this invention will suggest themselves to those skilled in the art, and all such of these as come within its scope as best defined by the appended claims.

We claim:

1. A composite label web wound into a roll, comprising: a carrier web having a free end, a printable label web having pressure sensitive adhesive and being releasably adhered by the pressure sensitive adhesive to the carrier web, longitudinally spaced laterally extending lines of severing essentially completely severing only the label web into a series of labels, longitudinally spaced laterally extending lines of weakening in the carrier web, the lines of severing in the label web being spaced longitudinally further from the free end than the lines of weakening in the carrier web to provide an outwardly projecting lateral tab in the carrier web to facilitate manual separation of a label from the carrier web, and registration marks on the carrier web for registering the labels in a printer.

2. A composite label web as defined in claim 1, wherein the spacing between adjacent lines of severing in the label web is the same as the spacing between adjacent lines of weakening in the carrier web.

3. A composite label web as defined in claim 1, wherein the tab is less than 0.25 inch in length.

4. A composite label web wound into a roll, comprising: a carrier web having a free end, a printable label web having pressure sensitive adhesive and being releasably adhered by the pressure sensitive adhesive to the carrier web, longitudinally spaced laterally extending lines of severing essentially completely severing only the label web into a series of labels, longitudinally spaced laterally extending lines of weakening in the carrier web, the lines of severing in the label web being spaced longitudinally further from the free end than the lines of weakening in the carrier web to provide an outwardly projecting lateral tab in the carrier web to facilitate manual separation of a label from the carrier web, registration marks on the carrier web for registering the labels in a printer, and wherein the longitudinal dimension of the tab is less than 10% of the length of a label.

5. A composite label web as defined in claim 4, wherein the longitudinal dimension of the tab is about 0.12 inch±0.04 inch.

6. A composite label web wound into a roll, comprising: a carrier web having a free end, a printable label web having pressure sensitive adhesive and being releasably adhered by the pressure sensitive adhesive to the carrier web, longitudinally spaced laterally extending lines of severing essentially completely severing only the label web into a series of labels, longitudinally spaced laterally extending lines of weakening in the carrier web, the lines of severing in the label web being spaced longitudinally further from the free end than the lines of weakening in the carrier web to provide an outwardly projecting lateral tab in the carrier web to facilitate manual separation of a label from the carrier web, registration marks on the carrier web for registering the labels in a printer, and wherein the longitudinal dimension of the tab is about 0.12±0.04 inch.

* * * * *